United States Patent
Saylor et al.

(10) Patent No.: US 11,872,862 B2
(45) Date of Patent: Jan. 16, 2024

(54) AUTOMATIC CORNER WEIGHT ADJUSTMENT OF VEHICLE WITH AUTOMATED SPRING SEATS

(71) Applicant: GM Global Technology Operations LLC, Detroit, MI (US)

(72) Inventors: Brian K. Saylor, South Lyon, MI (US); Matthew Gregory Kowal, Brighton, MI (US); Robert Patrick Marble, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 185 days.

(21) Appl. No.: 17/592,875

(22) Filed: Feb. 4, 2022

(65) Prior Publication Data

US 2023/0249511 A1    Aug. 10, 2023

(51) Int. Cl.
*B60G 17/017* (2006.01)
*B60G 17/018* (2006.01)
*B60G 17/02* (2006.01)

(52) U.S. Cl.
CPC ......... *B60G 17/017* (2013.01); *B60G 17/018* (2013.01); *B60G 17/02* (2013.01); *B60G 2600/172* (2013.01)

(58) Field of Classification Search
CPC .......... B60G 17/015; B60G 17/0157; B60G 17/017; B60G 17/018; G01G 19/025; G01G 19/028
See application file for complete search history.

(56) References Cited

U.S. PATENT DOCUMENTS

| | | | | |
|---|---|---|---|---|
| 4,793,047 A | * | 12/1988 | Curtis | B61F 5/36 105/209 |
| 4,969,112 A | * | 11/1990 | Castle | G01G 23/3728 340/505 |
| 7,922,181 B2 | * | 4/2011 | Hakui | B60G 17/052 280/5.514 |
| 8,904,653 B1 | * | 12/2014 | Miaskiewicz | G01B 11/2755 33/203.18 |
| 2005/0167164 A1 | * | 8/2005 | Takeda | B60G 17/018 177/136 |
| 2006/0071441 A1 | * | 4/2006 | Mathis | B60G 11/16 280/124.128 |
| 2008/0119978 A1 | * | 5/2008 | Stieff | G01B 11/2755 701/31.4 |
| 2015/0239526 A1 | * | 8/2015 | Ishikawa | B62K 25/283 280/6.152 |
| 2022/0234598 A1 | * | 7/2022 | Hägele | G01G 19/028 |

* cited by examiner

*Primary Examiner* — Phutthiwat Wongwian
*Assistant Examiner* — Anthony L Bacon
(74) *Attorney, Agent, or Firm* — CANTOR COLBURN LLP

(57) ABSTRACT

A weight balancing system for a vehicle performs a method of adjusting a weight on a wheel of a vehicle. The system includes a processor of the vehicle and a scale. A wheel of the vehicle is placed on the scale, the wheel having an associated spring seat and associated spring. The scale measures a weight placed on the wheel by the vehicle and communicates the weight to the processor. The processor activates the spring seat to adjust a length of the spring, thereby adjusting the weight placed on the wheel by the vehicle.

20 Claims, 5 Drawing Sheets

AUTOMATIC CORNER WEIGHT ADJUSTMENT OF VEHICLE WITH AUTOMATED SPRING SEATS

INTRODUCTION

The subject disclosure relates to balancing vehicle weight and in particular, to an automated system and method for balancing the weight of a vehicle.

Vehicle performance is based, in part, on having the weight of the vehicle equally or appropriately distributed amongst its wheels. The weight on a wheel can be adjusted by extending or retracting a spring seat of the wheel. In typical balancing procedures, an operator measures a weight on the wheel and adjusts the spring seat as appropriate to the best judgement of the operator. A downward impulse is applied at a wheel to overcome any friction forces that occur as a result of the adjustment. However, the precision of the adjustment process and of the downward impulse tends to differ from wheel to wheel due to operator error and variance, thus affecting the precision with which the vehicle can be balanced. Accordingly, it is desirable to provide a more precise system and method for balancing the weight of the vehicle between its wheels.

SUMMARY

In one exemplary embodiment, a method of adjusting a weight on a wheel of a vehicle is disclosed. The wheel of the vehicle is placed on a scale, the wheel having an associated spring seat and an associated spring. A weight placed on the wheel by the vehicle is measured at the scale. The weight on the wheel from the scale is communicated to a processor at the vehicle. The processor activates the spring seat to adjust a length of the spring, thereby adjusting the weight placed on the wheel by the vehicle.

In addition to one or more of the features described herein, the method further includes calculating a difference between the weight on the wheel and the weight on another wheel of the vehicle and activating the spring seat to reduce the difference. Activating the spring seat includes applying a decaying sinusoidal waveform at the spring seat to reduce an effect of static friction within an associated suspension component. The method further includes storing a first setting of the spring seat for a first weight based on a first passenger in the vehicle, storing a second setting of the spring seat for a second weight based on a second passenger in the vehicle, and selecting, at an interface, one of the first setting and the second setting when a respective one of the first passenger and the second passenger is in the vehicle. The method further includes storing a first setting for the spring seat that accommodates the vehicle for traversing a first track, storing a second setting for the spring seat that accommodates the vehicle for traversing a second track, and selecting, at an interface, one of the first setting and the second setting for the vehicle to traverse a respective one of the first track and the second track. The method further includes adjusting the length of the spring manually at a human-machine interface. The method further includes performing an adjustment of the weight placed on the wheel by the vehicle while the vehicle is being driven, wherein the adjustment includes at least one of an adjustment based on a calculated change of mass distribution of the vehicle, an adjustment based on a calculated change of mass distribution due to fuel consumption, and an adjustment for corner balancing.

In another exemplary embodiment, a method of balancing a weight of a vehicle is disclosed. The vehicle is placed with a first wheel on a first scale and a second wheel on a second scale, the first wheel having a first spring seat and a first spring and the second wheel having a second spring seat and a second spring. A first weight placed on the first wheel is measured at the first scale. A second weight placed on the second wheel is measured at the second scale. The first weight and the second weight are communication to a processor at the vehicle. The processor determines a difference between the first weight and the second weight and activates at least one of the first spring seat and the second spring seat to adjust a length of at least one of the first spring and the second spring to balance the weight of the vehicle based on the difference.

In addition to one or more of the features described herein, the method further includes applying a decaying sinusoidal waveform at the at least one of the first spring seat and the second spring seat to minimize an effect of static friction at a suspension component associated with the at least one of the first spring seat and the second spring seat. The method further includes storing a first setting of the at least one of the first spring seat and the second spring seat corresponding to a first passenger in the vehicle, storing a second setting of the at least one of the first spring seat and the second spring seat corresponding to a second passenger in the vehicle, and selecting, at an interface, one of the first setting and the second setting when a respective one of the first passenger and the second passenger is in the vehicle. The method further includes storing a first setting for the at least one of the first spring seat and the second spring seat that accommodates the vehicle for traversing a first track, storing a second setting for the at least one of the first spring seat and the second spring seat that accommodates the vehicle for traversing a second track, and selecting, at an interface, one of the first setting and the second setting for the vehicle to traverse a respective one of the first track and the second track. The method further includes adjusting the length of the at least one of the first spring and the second spring manually at a human-machine interface. The method further includes performing an adjustment to balance the weight of the vehicle while the vehicle is being driven, wherein the adjustment includes at least one of an adjustment based on a calculated change of mass distribution of the vehicle, an adjustment based on a calculated change of mass distribution due to fuel consumption, and an adjustment for corner balancing.

In yet another exemplary embodiment, a weight balancing system for a vehicle is disclosed. The system includes a processor of the vehicle and a first scale. A first wheel of the vehicle is placed on the first scale, the first wheel having an associated spring seat and an associated spring, the first scale configured to measure a weight placed on the first wheel by the vehicle and communicate the weight to the processor. The processor is configured to activate the spring seat to adjust a length of the spring, thereby adjusting the weight placed on the wheel by the vehicle.

In addition to one or more of the features described herein, the weight balancing system further includes a second scale configured to measure a weight placed on a second wheel of the vehicle, and communication the weight to the processor, wherein the processor calculates a difference between the weight on the first wheel and the weight on the second wheel and activates the spring seat to reduce the difference. The processor is further configured to apply a decaying sinusoidal waveform at the spring seat to reduce an effect of static friction at a suspension component associated with the spring seat. The weight balancing system further includes a memory device for storing a first spring setting of the spring seat and a second spring setting of the spring seat, and an interface through which one of the first spring seat setting and the second spring seat setting can be selected for one of a first passenger and a second passenger, respectively. In an embodiment, the first spring setting is for a first weight placed on the first wheel that includes the weight of a first passenger and the second spring setting is for a second weight placed on the first wheel that includes the weight of a second passenger. In another embodiment, the first spring setting accommodates the vehicle for traversing a first track and the second spring setting accommodates the vehicle for traversing a second track. The weight balancing system further includes a human-machine interface through which an operator can adjust the length of the spring manually. The processor is further configured to perform a fine adjustment of the vehicle weight while the vehicle is being driven, wherein the fine adjustment includes at least one of an adjustment based on a calculated change of mass distribution of the vehicle, an adjustment based on a calculated change of mass distribution due to fuel consumption, and an adjustment for corner balancing.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
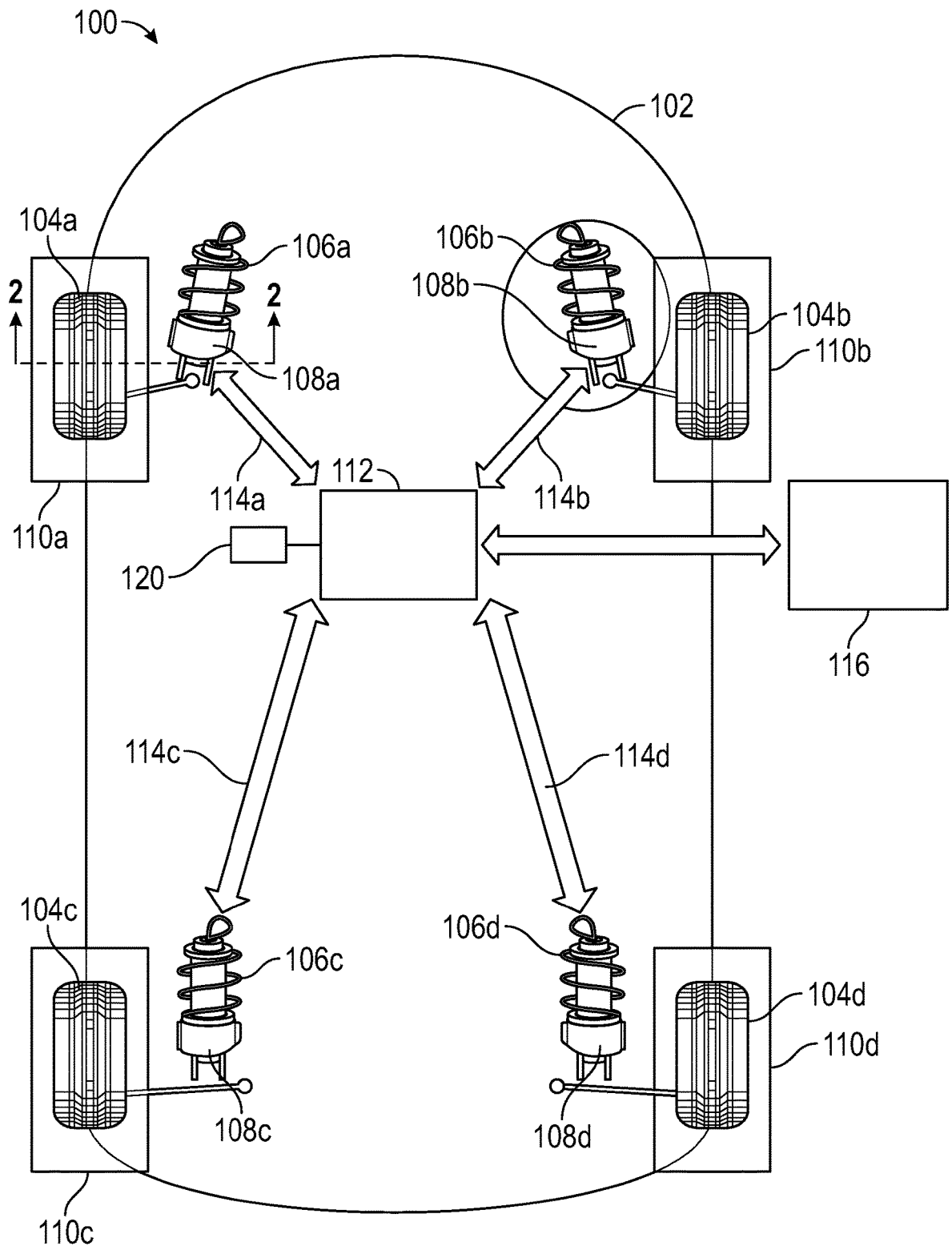
FIG. 1 shows schematically a plan view of a weight adjustment system for a vehicle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows schematically a plan view 100 of a weight adjustment system for a vehicle 102. The vehicle 102 includes four wheels 104a-104d, each attached to the vehicle via associated springs 106a-106d. A spring attaches between the wheel and the vehicle 100 to support a portion of the weight of the vehicle at the wheel. Each spring 106a-106d includes a spring seat 108a-108d that can be used to extend or contract a length (i.e., axial length) of the associated spring 106a-106d. A spring seat includes an upper and lower member that capture the spring therebetween. The distance between the upper and lower member is adjustable to adjust a length of the spring. The vehicle 102 is parked in place so that each of its four wheels 104a-104d are placed on top of corresponding scales 110a-110d. The scales 110a-110d are in communication with a processor 112 of the vehicle 102 via communication pathways 114a-114d. In an embodiment, the communication pathways 114a-114d are wireless communication links. However, wired communication links can also be used for the communication pathways 114a-114d. The processor 112 is in communication with each of the spring seats 108a-108d and can send a signal to the spring seats to adjust a length of their respective springs. The processor 112 can also provide information to a human machine interface 116, which can display the information for a human to observe. The human machine interface 116 can also allow the human to send instructions to the processor 112, which can then adjust one or more of the spring seats 108a-108d (and thereby the lengths of their respective springs) according to the instructions. The processor 112 is also in communication with a memory storage device or memory 120. Spring seat settings can be stored to the memory 120 and recalled from memory. An operator can select a setting at the human machine interface 116 to cause the processor 112 to recall the spring seat setting and apply the spring seat setting as selected by the operator.

The processor 112 and memory 120 can be included in a controller of the vehicle 102. The controller may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller may include a non-transitory computer-readable medium that stores instructions which, when processed by one or more processors of the controller, implement a method of balancing the weight of the vehicle amongst its wheels according to one or more embodiments detailed herein.

Figure 2:
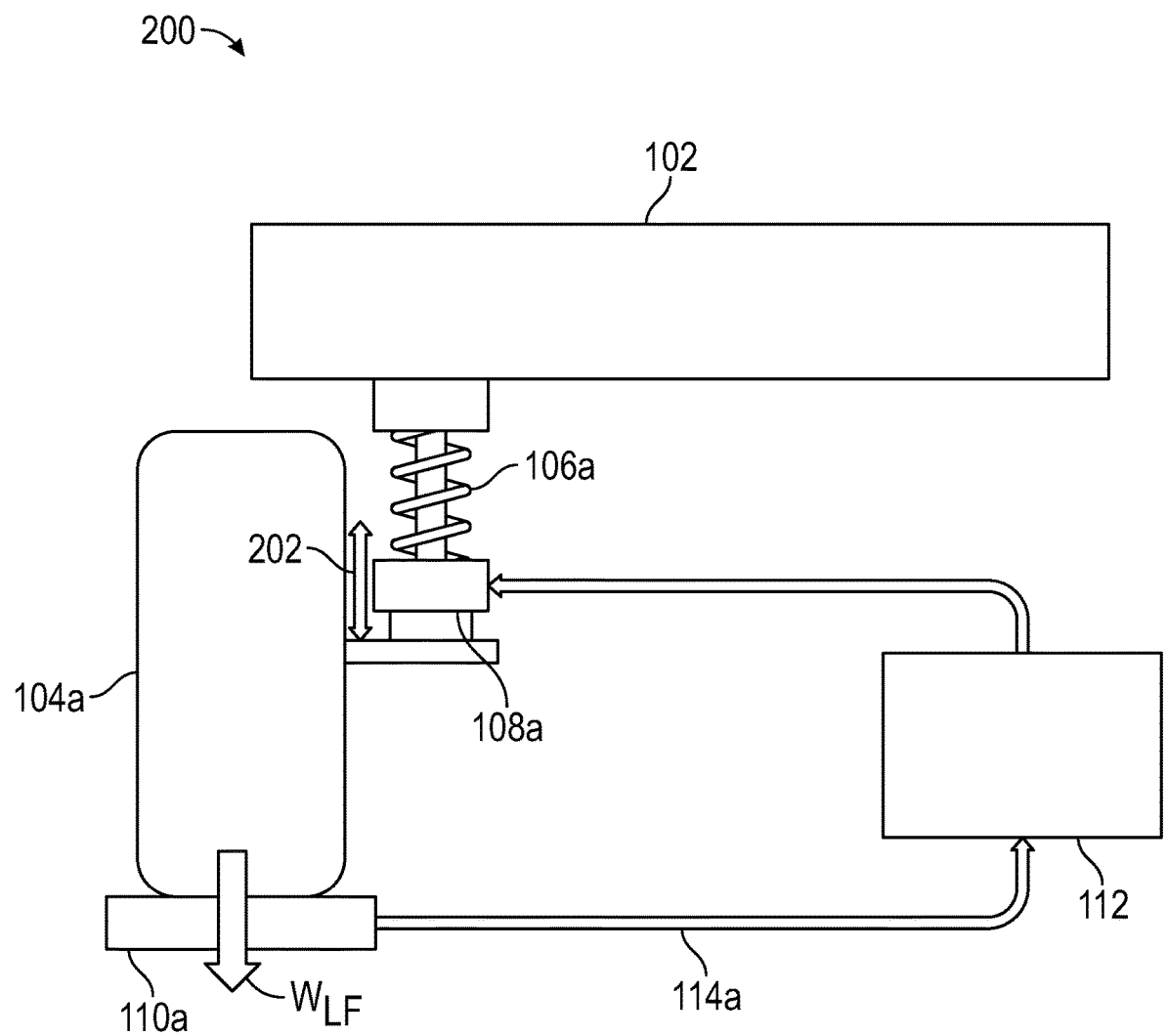
FIG. 2 shows a side view of a section at a left front wheel of the vehicle.

FIG. 2 shows a schematic view 200 of a section at a left front wheel 104a of the vehicle 102. The section shows scale 110a, spring 106a, spring seat 108a, and processor 112. Left front wheel 104a is placed on the scale 110a. The scale 110a measures a weight $W_{LF}$ being carried by the left front wheel 104a and communicates a signal to the processor 112 to indicate the weight $W_{LF}$. The processor 112 communicates a signal to the spring seat 108a to either extend the spring seat (i.e., increase the length of the spring) or retract the spring seat (i.e., reduce the length of the spring). As indicated by arrow 202. Adjusting the length of the spring seat 108a either transfers weight of the vehicle 102 off the left front wheel 104a or transfers additional weight of the vehicle 102 onto the left front wheel. The new weight $W_{LF}$ can then be transmitted to the processor 112 to create a feedback loop.

Figure 3:
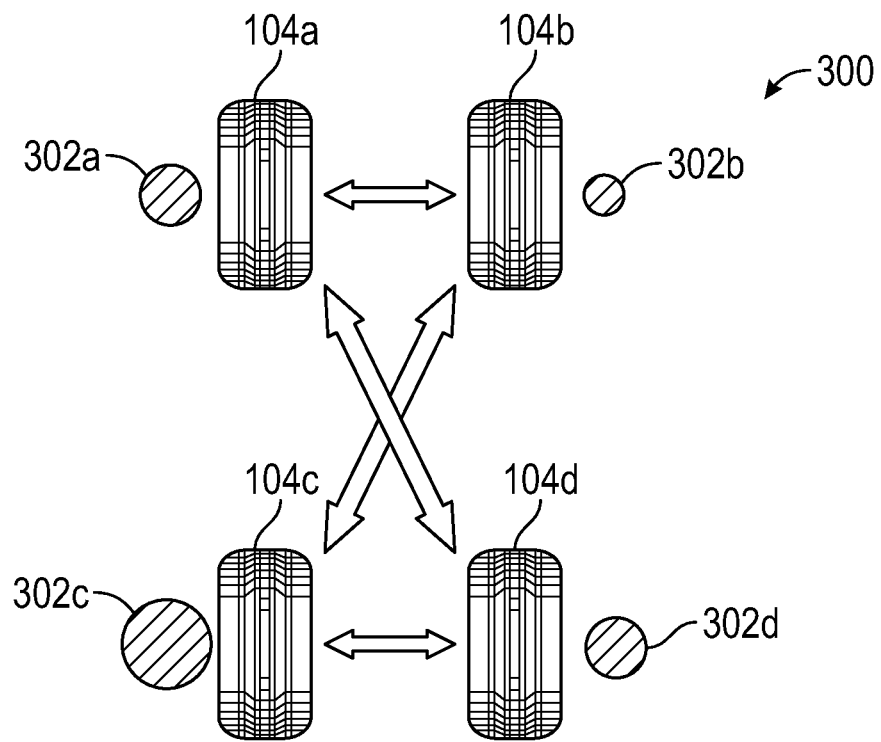
FIG. 3 is a diagram illustrating wheel weights at the vehicle.

FIG. 3 is a diagram 300 illustrating wheel weights at the vehicle 102. The four wheels 104a-104d are shown, including left front wheel 104a, right front wheel 104b, left rear wheel 104c and right rear wheel 104d. Each of the four wheels 140a-104d is shown with an associated sphere 302a-302d indicating weight on the wheel. The radius of a sphere (e.g., sphere 302a) represents a magnitude of a portion of the weight of the vehicle 102 being carried by its associated wheel (e.g., left front wheel 104a). As shown in FIG. 3, the vehicle 102 is in an unbalanced weight configuration. The weight $W_{LF}$ of the left front wheel 104a is about the same as the weight $W_{RR}$ of the right rear wheel 104d. The weight $W_{RF}$ of the right front wheel 104b is the smallest of the weights, while the weight $W_{LR}$ of the left rear wheel 104c is the largest of the weights.

A difference (or 'delta') can be calculated between any two weight measurements. A front cross-axle delta ($\Delta_{LF,RF}$) is a difference between the weights $W_{LF}$ and $W_{RF}$ (i.e., left front wheel 104a and right front wheel 104b). A rear cross-axle delta ($\Delta_{LR,RRF}$) is a difference between the weights $W_{LR}$ and $W_{RR}$ (i.e., left rear wheel 104c and right rear wheel 104d). A first diagonal delta ($\Delta_{LF,RR}$) is a difference between the weights $W_{LF}$ and $W_{RR}$ (i.e., left front wheel 104a and right rear wheel 104d). A second diagonal delta ($\Delta_{LR,RF}$) is a difference between the weights $W_{LR}$ and $W_{RF}$ (i.e., left rear wheel 104c and right front wheel 104b).

The processor 112 calculates these four deltas from the weight measurements obtained at the scales 110a-110d. The delta having the largest magnitude is identified and the appropriate spring seats are then adjusted to reduce this delta. This process can be repeated until all the deltas are equal to zero or are equal to zero within a specified tolerance.

Figure 4:
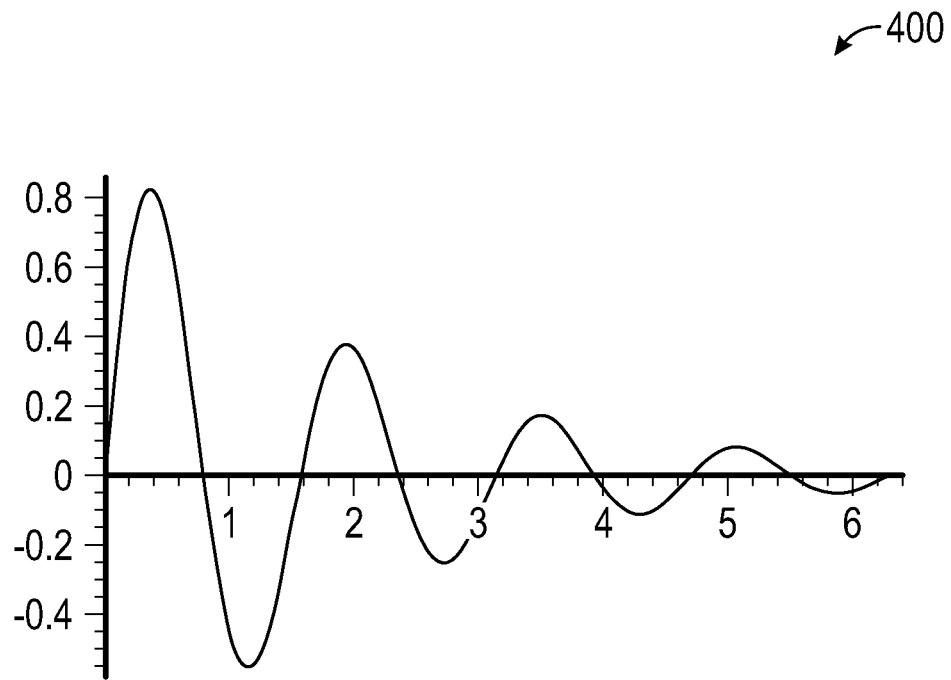
FIG. 4 shows a decaying sinusoidal waveform that can be applied to one or more of the spring seats during the weight balancing process.

FIG. 4 shows a decaying sinusoidal waveform 400 that can be applied to one or more of the spring seats 108a-108d during the weight balancing process. The waveform can be produced by sending an impulse signal from the processor 112 to a spring seat (e.g. spring seat 108a) associated with a wheel (e.g. left front wheel 104a) to displace the its associated spring from an equilibrium position. This displacement caused by the impulse signal can be referred to as a "jounce". The waveform is then formed as the spring seat returns to its equilibrium position or locates a new equilibrium position. Alternatively, the processor 112 sends a signal that moves the spring seat to extend and retract in the form of the decaying sinusoidal waveform 400. The decaying sinusoidal waveform 400 is applied to the spring seat in order to overcome any residual static friction in the spring and/or any other suspension components associated with the wheel. The residual static friction hinders the ability of the spring to adjust to a desired length at which weight is balanced. Thus, overcoming the residual static friction allows the spring to adjust more accurately to the desired length.

Figure 5:
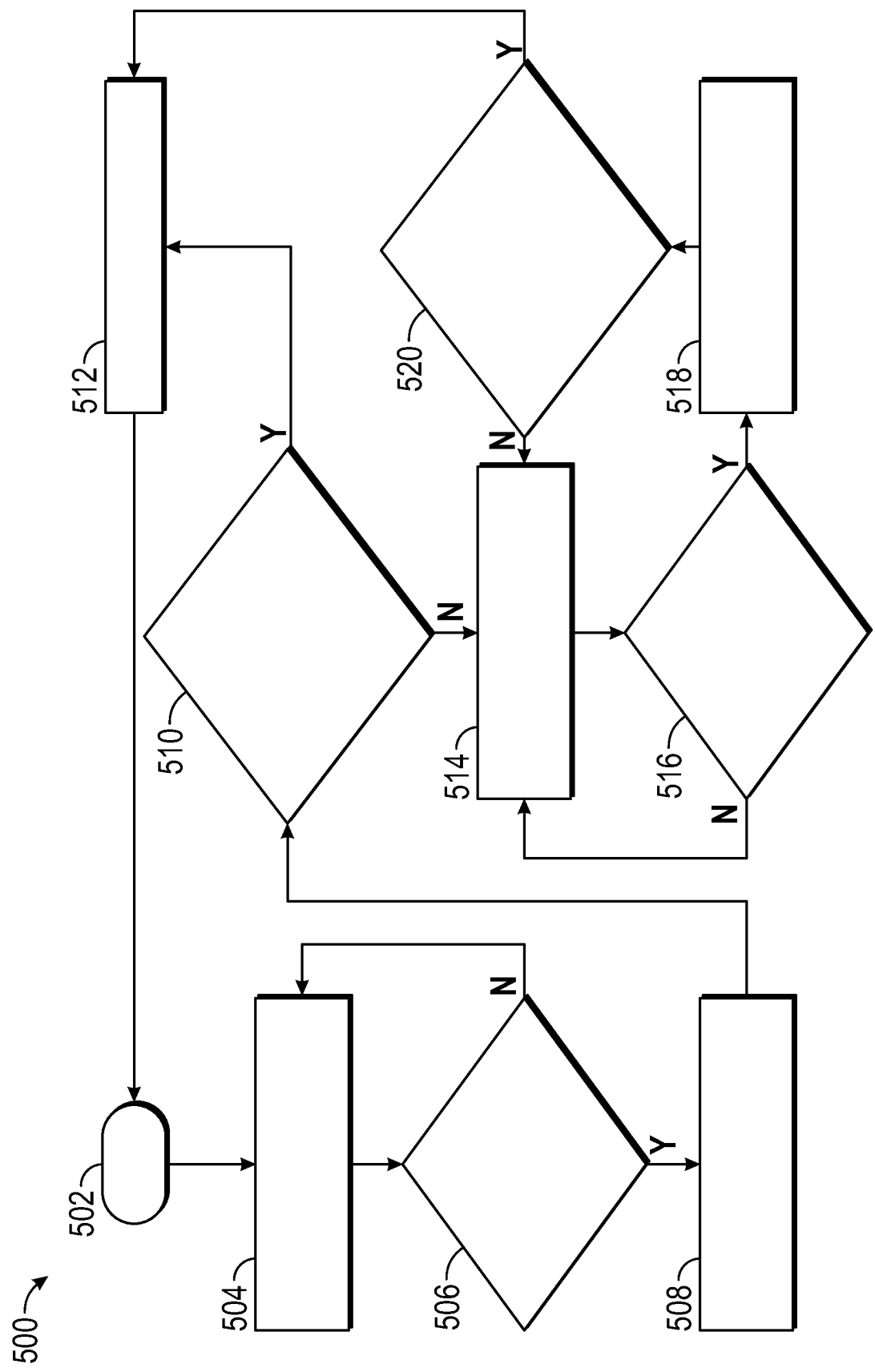
FIG. 5 shows a flowchart of a method for automated corner weight adjustment of the vehicle using the spring seats.

FIG. 5 shows a flowchart 500 of a method for automated corner weight adjustment of the vehicle using the spring seats. The method starts at box 502. In box 504, the vehicle is moved onto the scales 110a-110d. In box 506, the processor 112 waits for a corner balancing signal from the driver. If the driver has not initiated the corner balancing, the method returns to box 504 in which the vehicle can be readjusted on the scales. At box 506, once the driver initiates the corner balancing, the method proceeds to box 508. In box 508, one or more communication pathways are established between the scales 110a-110d and the processor 112.

In box 510, weight measurements are obtained at each of the four scales 110a-110d and compared to each other. Measurement comparisons are between axle wheels (left front (LF) vs. right front (RF), left rear (LR) vs. right rear (RR)) and diagonally related wheels (left front (LF) vs. right rear (RR), left rear (LR) vs. right front (RF)). These differences are compared to a calibration threshold. The calibration threshold can be a limit to a sensitivity of the technology or can be a desired epsilon (e.g., 2%) within the target weight distribution. If the differences between cross-axle and diagonally opposite wheels are equal to or less than the calibration threshold, the method proceeds to box 512. In box 512, the weight measurements are displayed to the user or driver and the method returns to the start at box 502.

Referring again to box 510, if at least one of the differences is greater than the calibration threshold, the method proceeds to box 514. In box 514, the lengths of the springs of wheels that are diagonally opposite each other are adjusted to shift the weight distribution between them. In box 516, if the difference between diagonally opposite wheels is still greater than the calibration threshold, the method returns to box 514. Referring back to box 516, if the difference between diagonally opposite wheels is equal to or less than the calibration threshold, the method proceeds to box 518.

In box 518, a jounce (i.e., an impulse that produces a decaying sinusoidal waveform at the spring seat) is applied to the spring seat to overcome any static friction within any associated suspension components (including the spring seat), thereby allowing the spring to settle into a final length. In box 520, the cross-axle and diagonally opposite weight measurements are compared to each other. If the differences between these weight measurements are equal to or less than the calibration threshold, the method proceeds to box 512 in which the results are displayed to the user. However, at box 520, if at least one of these differences is greater than the calibration threshold, the method returns to box 514.

Figure 6:
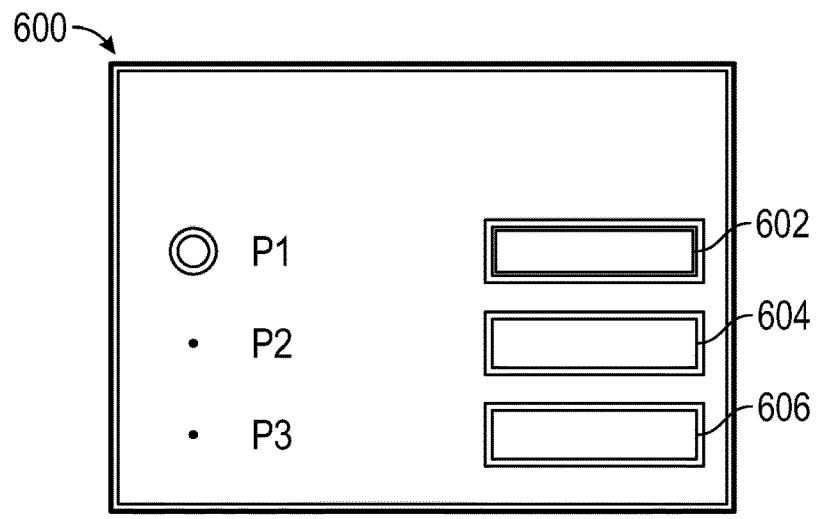
FIG. 6 shows an illustrative screenshot that can appear at the human machine interface to make spring adjustments according to a stored customizable spring profile.

FIG. 6 shows an illustrative screenshot 600 that can appear at the human machine interface 116 to make spring adjustments according to a stored customizable spring profile. The screenshot 600 shows a plurality of Profile labels ("Profile 1" or "P1" 602, "Profile 2" or "P2" 604, "Profile 3" or "P3" 606), each having an associated selection button that can be touched or pushed by a human. When adjusting the weight distribution, the weight of the driver or passenger(s) is to be included. Thus, the driver or passenger(s) sit in the vehicle during the adjustment process. The weight distribution of the vehicle therefore changes when a different driver gets in the car. Using the display screen 600, a first weight distribution calibration can be made for a first passenger(s), and the first settings of the spring seats after the calibration can be stored in memory as the first profile ("Profile 1" or "P1" 602). A second weight distribution calibration can be performed with a second passenger(s) and the second settings of the spring seats after the calibration can be stored in memory as the second profile ("Profile 2" or "P2" 604), etc. Thus, when the first driver gets in the vehicle at a later time, he can pull up the screen 600 and select "Profile 1" or "P1" 602 to adjust the spring seats to their first settings. When the second driver gets in the vehicle at a later time, she can pull up the screen 600 and select "Profile 2" or "P2" 604 to adjust the spring seats to their second settings. Additional profiles can be provided to accommodate different passengers or driver/passenger combinations or different track driving/handling conditions.

Figure 7:
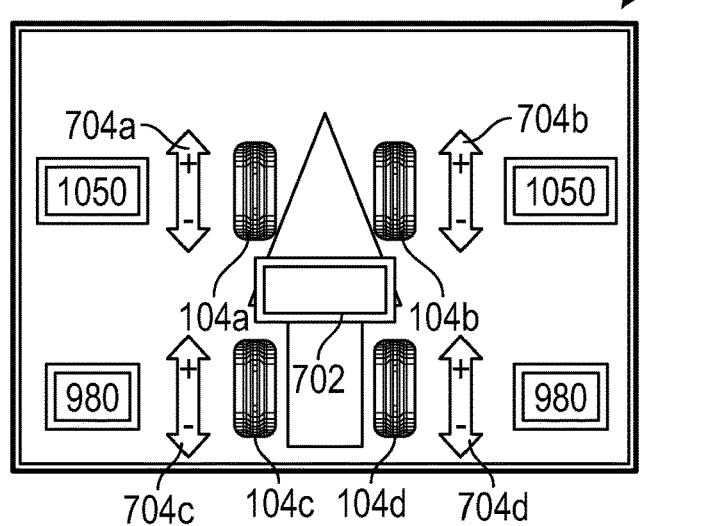
FIG. 7 shows an illustrative screenshot that can be presented to allow the driver to manually adjust the weight distribution on the wheels.

FIG. 7 shows an illustrative screenshot 700 that can be presented to allow the driver to manually adjust the weight distribution on the wheels. The screenshot 700 shows a representation of the wheels 104a-104d and an AUTO button 702 that can be selected to commence a manual adjustment mode. In addition, the screenshot 700 displays adjustment arrows 704a-704d. The adjustment arrows 704a-704d can be used to either increase or decrease the weight on its associated wheel.

Figure 8:
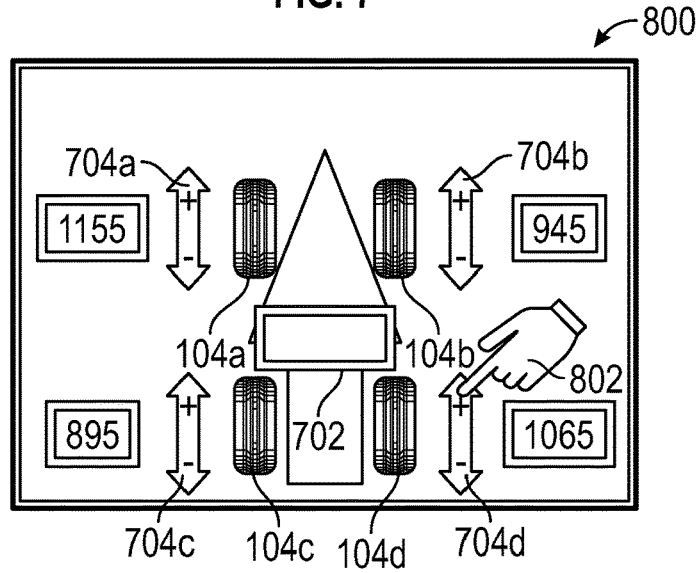
FIG. 8 shows a screenshot in which a manual adjustment is being made to the distribution of weight on the wheels.

FIG. 8 shows a screenshot 800 in which a manual adjustment is being made to the distribution of weight on the wheels. Adjustment arrows 704*a*-704*d* each have an "up" end ("+") for increase an amount of weight carried by the wheel and a "down" end ("−") for decreasing an amount of weight carried by the wheel. The instruction selected by the driver is sent to the processor, which adjusts the spring seats accordingly. In the screenshot 800, the operator 802 is has touched the "up" end of arrow 704*d* to increase the weight distributed on to the right rear tire 104*d*.

Using the manual adjustment, the driver can adjust weight to accommodate a track or road for which the vehicle is being used. For example, for a performance vehicle that is being used to race around an oval track, the weight distribution can be manually selected to have more weight on wheels near an outside turn of the track. Once the spring seats are adjusted to the driver's specification, the settings for the spring seat can be stored in a profile (which can be labelled "Oval Track", for example) In another example, the driver can manually adjust the weight distribution for a Grand Prix track and save the settings in another profile (which can be labelled "Grand Prix").

The manual adjustment also allows the operator to adjust the weight while the vehicle is being driven. In various embodiments, the weight distribution can be adjusted for a varying mass load. In particular, a plurality of profiles can be stored for the vehicle having different levels of fuel stored in the vehicle. As the vehicle consumes the fuel, the weight distribution of the vehicle changes. Therefore, the weight distribution profile can be changed to match the level of fuel at the vehicle. The weight distribution can be changed while driving and can be selected either by selecting a different profile, automatic calculated adjustment or by manual adjustment.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of adjusting a weight on a wheel of a vehicle, comprising:
    placing the wheel of the vehicle on a scale, the wheel having an associated spring and an associated spring seat;
    measuring a weight placed on the wheel by the vehicle at the scale;
    communicating the weight on the wheel from the scale to a processor at the vehicle; and
    activating, via the processor, the spring seat to adjust a length of the spring, thereby adjusting the weight placed on the wheel by the vehicle.

2. The method of claim 1, further comprising:
    calculating a difference between the weight on the wheel and the weight on another wheel of the vehicle; and
    activating the spring seat to reduce the difference.

3. The method of claim 1, wherein activating the spring seat further comprises applying a decaying sinusoidal waveform at the spring seat to reduce an effect of static friction within an associated suspension component.

4. The method of claim 1, further comprising:
    storing a first setting of the spring seat for a first weight based on a first passenger in the vehicle;
    storing a second setting of the spring seat for a second weight based on a second passenger in the vehicle; and
    selecting, at an interface, one of the first setting and the second setting when a respective one of the first passenger and the second passenger is in the vehicle.

5. The method of claim 1, further comprising:
    storing a first setting for the spring seat that accommodates the vehicle for traversing a first track;
    storing a second setting for the spring seat that accommodates the vehicle for traversing a second track; and
    selecting, at an interface, one of the first setting and the second setting for the vehicle to traverse a respective one of the first track and the second track.

6. The method of claim 1, further comprising adjusting the length of the spring manually at a human-machine interface.

7. The method of claim 6, further comprising performing an adjustment of the weight placed on the wheel by the vehicle while the vehicle is being driven, wherein the adjustment includes at least one of: (i) an adjustment based on a calculated change of mass distribution of the vehicle; (ii) an adjustment based on a calculated change of mass distribution due to fuel consumption; and (iii) an adjustment for corner balancing.

8. A method of balancing a weight of a vehicle, comprising:
    placing the vehicle with a first wheel on a first scale and a second wheel on a second scale, the first wheel having a first spring seat and a first spring and the second wheel having a second spring seat and a second spring;
    measuring a first weight placed on the first wheel at the first scale;
    measuring a second weight placed on the second wheel at the second scale;
    communicating the first weight and the second weight to a processor at the vehicle;
    determining, at the processor, a difference between the first weight and the second weight; and
    activating, via the processor, at least one of the first spring seat and the second spring seat to adjust a length of at least one of the first spring and the second spring to balance the weight of the vehicle based on the difference.

9. The method of claim 8, further comprising applying a decaying sinusoidal waveform at the at least one of the first spring seat and the second spring seat to minimize an effect of static friction at a suspension component associated with the at least one of the first spring seat and the second spring seat.

10. The method of claim 8, further comprising:
    storing a first setting of the at least one of the first spring seat and the second spring seat corresponding to a first passenger in the vehicle;
    storing a second setting of the at least one of the first spring seat and the second spring seat corresponding to a second passenger in the vehicle; and
    selecting, at an interface, one of the first setting and the second setting when a respective one of the first passenger and the second passenger is in the vehicle.

11. The method of claim 8, further comprising:
    storing a first setting for the at least one of the first spring seat and the second spring seat that accommodates the vehicle for traversing a first track;
    storing a second setting for the at least one of the first spring seat and the second spring seat that accommodates the vehicle for traversing a second track; and selecting, at an interface, one of the first setting and the second setting for the vehicle to traverse a respective one of the first track and the second track.

12. The method of claim 8, further comprising adjusting the length of the at least one of the first spring and the second spring manually at a human-machine interface.

13. The method of claim 6, further comprising performing an adjustment to balance the weight of the vehicle while the vehicle is being driven, wherein the adjustment includes at least one of: (i) an adjustment based on a calculated change of mass distribution of the vehicle; (ii) an adjustment based on a calculated change of mass distribution due to fuel consumption; and (iii) an adjustment for corner balancing.

14. A weight balancing system for a vehicle, comprising:
    a processor of the vehicle; and
    a first scale, wherein a first wheel of the vehicle is placed on the first scale, the first wheel having an associated spring seat and an associated spring, the first scale configured to measure a weight placed on the first wheel by the vehicle and communicate the weight to the processor;
    wherein the processor is configured to activate the spring seat to adjust a length of the spring to thereby adjust the weight placed on the wheel by the vehicle.

15. The weight balancing system of claim 14, further comprising a second scale configured to measure a weight placed on a second wheel of the vehicle, and communication the weight to the processor, wherein the processor calculates a difference between the weight on the first wheel and the weight on the second wheel and activates the spring seat to reduce the difference.

16. The weight balancing system of claim 14, wherein the processor is further configured to apply a decaying sinusoidal waveform at the spring seat to reduce an effect of static friction at a suspension component associated with the spring seat.

17. The weight balancing system of claim 14, further comprising:
    a memory device for storing a first spring setting of the spring seat and a second spring setting of the spring seat; and
    an interface through which one of the first spring seat setting and the second spring seat setting can be selected for one of a first passenger and a second passenger, respectively.

18. The weight balancing system of claim 17, wherein at least one of: (i) the first spring setting is for a first weight placed on the first wheel that includes the weight of a first passenger and the second spring setting is for a second weight placed on the first wheel that includes the weight of a second passenger; and (ii) the first spring setting accommodates the vehicle for traversing a first track and the second spring setting accommodates the vehicle for traversing a second track.

19. The weight balancing system of claim 14, further comprising a human-machine interface through which an operator can adjust the length of the spring manually.

20. The weight balancing system of claim 19, wherein the processor is further configured to perform a fine adjustment of the vehicle weight while the vehicle is being driven, wherein the fine adjustment includes at least one of: (i) an adjustment based on a calculated change of mass distribution of the vehicle; (ii) an adjustment based on a calculated change of mass distribution due to fuel consumption; and (iii) an adjustment for corner balancing.

* * * * *